United States Patent
Zhong et al.

(10) Patent No.: US 12,466,964 B2
(45) Date of Patent: Nov. 11, 2025

(54) BIOMASS-BASED ANTI-SMUDGE PAINT AND PREPARATION METHOD AND APPLICATION THEREOF

(71) Applicant: Zhongkai University of Agriculture and Engineering, Guangzhou (CN)

(72) Inventors: Ximing Zhong, Guangzhou (CN); Xinhua Zhou, Guangzhou (CN); Hongjun Zhou, Guangzhou (CN)

(73) Assignee: Zhongkai University of Agriculture and Engineering, Guangzhou (CN)

( * ) Notice: Subject to any disclaimer, the term of this patent is extended or adjusted under 35 U.S.C. 154(b) by 0 days.

(21) Appl. No.: 19/034,907

(22) Filed: Jan. 23, 2025

(65) Prior Publication Data
US 2025/0243373 A1 Jul. 31, 2025

(30) Foreign Application Priority Data
Jan. 31, 2024 (CN) .......................... 202410136534.0

(51) Int. Cl.
| | | |
|---|---|---|
| *C09D 7/00* | (2018.01) | |
| *C09D 5/08* | (2006.01) | |
| *C09D 7/63* | (2018.01) | |
| *C09D 7/65* | (2018.01) | |
| *C09D 7/80* | (2018.01) | |

(52) U.S. Cl.
CPC ................ *C09D 7/63* (2018.01); *C09D 5/08* (2013.01); *C09D 7/65* (2018.01); *C09D 7/80* (2018.01)

(58) Field of Classification Search
None
See application file for complete search history.

(56) References Cited

U.S. PATENT DOCUMENTS

| | | | |
|---|---|---|---|
| 8,815,969 B2* | 8/2014 | Chen ..................... | C08K 5/103 522/107 |
| 2021/0102054 A1* | 4/2021 | Kono ..................... | C09J 133/08 |

OTHER PUBLICATIONS

Zhongkai University of Agriculture and Engineering (Applicant), Claims (allowed) of CN202410136534.0, Jan. 31, 2024.
CNIPA, Notification to grant patent right for invention in CN202410136534.0, Feb. 21, 2025.

* cited by examiner

*Primary Examiner* — Stefanie J Cohen
(74) *Attorney, Agent, or Firm* — Hemisphere Law, PLLC; Zhigang Ma

(57) ABSTRACT

A biomass-based anti-smudge paint and its preparation method and application are provided. The preparation method includes the following steps: plant oil reacts with mercaptosuccinic acid to obtain a biomass-based polyacid, and then a crosslinker and low-surface-tension substance are added to the biomass-based polyacid and mixed to obtain the biomass-based anti-smudge paint. The biomass-based anti-smudge paint is cured to obtain a biomass-based anti-smudge coating with heavy crosslinking and low surface energy. Since mercaptosuccinic acid-modified plant oil is developed as coating precursor to provide sufficient crosslinking sites for the construction of the heavily crosslinked coating, and thus the obtained anti-smudge coating is classified as biomass-based coating. Moreover, the water contact angle on coating surface is as high as over 103°, and the hexadecane contact angle on coating surface is as high as over 28°. The coating also demonstrates excellent anti-ink ability and self-cleaning performance.

7 Claims, No Drawings

BIOMASS-BASED ANTI-SMUDGE PAINT AND PREPARATION METHOD AND APPLICATION THEREOF

CROSS-REFERENCE TO RELATED APPLICATION

This application claims priority to Chinese Patent Application No. 202410136534.0, filed on Jan. 31, 2024, which is herein incorporated by reference in its entirety.

TECHNICAL FIELD

The disclosure relates to the field of polymer coating technologies, and more particularly to a biomass-based anti-smudge paint and its preparation method and application.

BACKGROUND

Anti-smudge coatings, with low surface energy, can prevent both water-based and oil-based substances from causing contamination on surfaces of the anti-smudge coatings. The anti-smudge coatings are applicable in areas such as self-cleaning, anti-graffiti, fingerprint resistance, and corrosion resistance, offering broad prospects for application. In current research, when preparing the anti-smudge coatings, it is first necessary to either prepare or select resins with high functionality to increase a crosslinking density of the anti-smudge coating. However, existing resins with high functionality and high crosslinking density are mainly prepared using traditional fossil materials. These fossil materials are non-renewable and are not conducive to environmental protection.

A preparation method of a novel plant oil-based organic-inorganic hybrid paint is disclosed in the related art. A thiol-ene click reaction is used to first graft 2-hydroxy-1-ethanethiol onto soybean oil, then ethyl acetoacetate is used to convert hydroxyl groups into ester groups, and finally, aminosilane as a crosslinker is added to prepare a water-repellent coating. However, the ethyl acetoacetate, used in the preparation process of the water-repellent coating, still belongs to the fossil materials (and the amount of the ethyl acetoacetate used is five times that of the modified soybean oil), which reduces a biomass content in the water-repellent coating. Moreover, a maximum water contact angle of the water-repellent coating is only in a range of 97.5°-100.5°, and this preparation method in the related art does not focus on the anti-smudge performance against oil-based materials.

SUMMARY

In order to solve problems that it is difficult to prepare a heavily crosslinked and low-surface-energy biomass-based anti-smudge coating in the related art, the disclosure provides a preparation method of a biomass-based anti-smudge paint, plant oil reacts with mercaptosuccinic acid to obtain a biomass-based polyacid, and then an aziridine crosslinker and mono-carboxyl-terminated polydimethylsiloxane are added to obtain a paint with a high density of reactive groups internally, and a coating with a heavily crosslinked structure and low surface energy is thereby formed. The coating obtained is water-repellent and oil-repellent, exhibiting excellent anti-smudge properties.

The disclosure further provides a biomass-based anti-smudge paint.

The disclosure further provides a biomass-based anti-smudge coating.

The disclosure further provides an application method of the biomass-based anti-smudge coating.

The disclosure has the following technical solutions to achieve above purposes.

The preparation method of the biomass-based anti-smudge paint includes:
- S1, preparing a biomass-based polyacid, including: mixing plant oil, mercaptosuccinic acid, and an initiator followed by reacting sufficiently under light irradiation to obtain the biomass-based polyacid; and
- S2, preparing the biomass-based anti-smudge paint, including: mixing the biomass-based polyacid obtained in the step S1, an aziridine crosslinker, and mono-carboxyl-terminated polydimethylsiloxane uniformly to obtain the biomass-based anti-smudge paint.

In the step S1, a molar ratio of carbon-carbon double bonds in the plant oil to the mercaptosuccinic acid is not greater than 1:1.05.

In the step S2, a weight ratio of a total weight of the biomass-based polyacid and the aziridine crosslinker to the mono-carboxyl-terminated polydimethylsiloxane is 1:(0.004-0.012).

In the step S2, a molar ratio of total carboxyl groups in the biomass-based polyacid and the mono-carboxyl-terminated polydimethylsiloxane, to aziridines in the aziridine crosslinker is 1:(0.85-1.3).

The biomass-based anti-smudge coating prepared in the disclosure has a main material that is the biomass-based polyacid made from the plant oil and the mercaptosuccinic acid. Therefore, the coating made from the biomass-based anti-smudge paint is a biomass-based coating, which is environmentally friendly.

In the step S1, after mixing the plant oil, the mercaptosuccinic acid, and the initiator, under light irradiation, the initiator triggers a thiol-ene photoclick reaction between the carbon-carbon double bonds in the plant oil and sulfhydryl groups in the mercaptosuccinic acid. The mercaptosuccinic acid is grafted onto plant oil molecules through carbon-sulfur (C—S) bonds, thereby forming the biomass-based polyacid. The specific reaction is shown in the following equation:

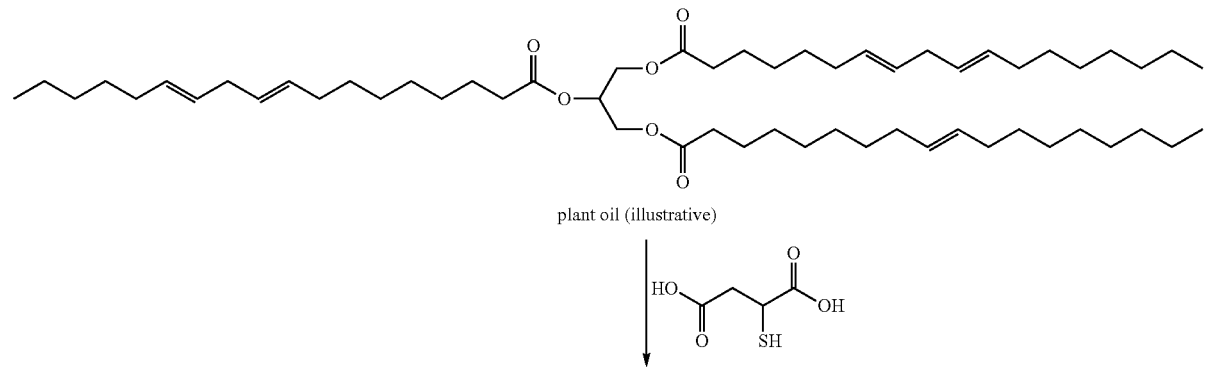

-continued

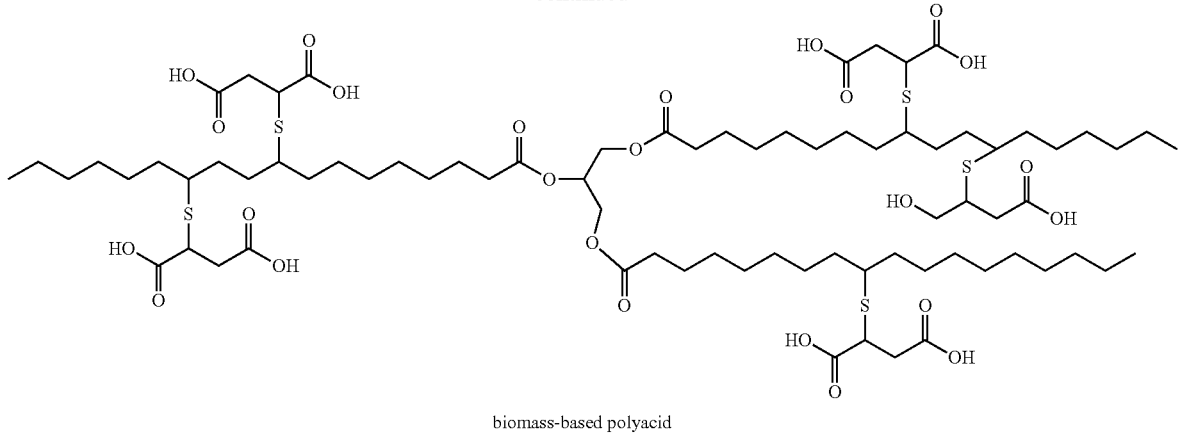

biomass-based polyacid

It should be noted that the structure of plant oils in the art is generally similar, being a triglyceride structure. The main difference lies in the quantity of the carbon-carbon double bonds per triglyceride unit.

In an embodiment, in the step S1, the light irradiation can be ultraviolet (UV) light irradiation. A specific wavelength of the light is determined by the initiator. Since the initiators used in the disclosure are all UV light initiators, the light can be the UV light.

After grafting the mercaptosuccinic acid onto the plant oil molecules, two carboxyl groups in the mercaptosuccinic acid are not participated in a grafting reaction. These two carboxyl groups can react with the aziridines in the aziridine crosslinker, thereby forming a polymer coating with a heavily crosslinked structure. It should be noted that the paint obtained by uniformly mixing the biomass-based polyacid, the aziridine crosslinker, and the mono-carboxyl-terminated polydimethylsiloxane in the disclosure is an uncured mixture. The coating is formed after the carboxyl groups and the aziridines undergo a crosslinking reaction for curing.

To prepare an anti-smudge coating, it is not only necessary for the coating itself to have a heavily crosslinked structure but also for the coating to have a low surface energy. Therefore, the disclosure also includes adding the mono-carboxyl-terminated polydimethylsiloxane as an anti-smudge agent to modify the coating system. It should be noted that the reason for limiting the polydimethylsiloxane to have only one end terminated by a carboxyl group is to graft the polydimethylsiloxane into a coating matrix through the reaction between the carboxyl groups and the aziridines. At the same time, an unterminated end of the polydimethylsiloxane chain segment tends to migrate to a surface of the coating to reduce the surface energy, thereby achieving an anti-smudge effect. If two ends of the polydimethylsiloxane are terminated by the carboxyl groups, then the polydimethylsiloxane chain segments would be fixed within the coating matrix, making it difficult for them to migrate to the surface of the coating to reduce surface energy, and the anti-smudge performance of the coating would be inferior than the coating prepared from mono-carboxyl-terminated polydimethylsiloxane using the same dosage.

The molar ratio of the carbon-carbon double bonds in the plant oil to the mercaptosuccinic acid has a crucial impact on the density of the polymer paint. If the molar ratio of the carbon-carbon double bonds in the plant oil to the mercaptosuccinic acid is greater than 1:1.05, i.e., the amount of the mercaptosuccinic acid added is too low, then the grafting rate of the carboxyl groups in the biomass-based polyacid will be too low.

The weight ratio of the total weight of the biomass-based polyacid and the aziridine crosslinker to the mono-carboxyl-terminated polydimethylsiloxane is controlled to be 1:(0.004-0.012) because the mono-carboxyl-terminated polydimethylsiloxane serves to modify the coating and reduce its surface energy. Therefore, if the amount of the mono-carboxyl-terminated polydimethylsiloxane is too low, the surface energy of the coating will not be low enough, and the anti-smudge performance will be insufficient. However, polydimethylsiloxane itself has poor compatibility with the biomass-based coating matrix. If too much mono-carboxyl-terminated polydimethylsiloxane is added, macroscopic phase separation will occur, causing the coating to become hazy and opaque, and the contraction will occur toward coating solution after its application on substrates, thereby making the surface of the coating uneven.

The molar ratio of the total carboxyl groups in the biomass-based polyacid and the mono-carboxyl-terminated polydimethylsiloxane to the aziridines in the aziridine crosslinker is controlled to be in a range of 1:(0.85-1.3). This is because when the ratio of the aziridines to the carboxyl groups in the system is within the range, the obtained coating has an appropriate crosslinking density, thereby exhibiting excellent anti-smudge performance. An excessive amount or an insufficient amount of the aziridine crosslinker both lead to a reduction in the crosslinking density of the coating, resulting in inferior anti-smudge performance.

In an embodiment, the plant oil can be one or more selected from the group consisting of soybean oil, flaxseed oil, and tung oil.

In an embodiment, in the step S1, the initiator can be one or more selected from the group consisting of 2,2-dimethoxy-2-phenylacetophenone (CAS: 24650-42-8), 2-hydroxy-2-methyl-1-phenyl-1-propanone (CAS: 7473-98-5), ethyl (2,4,6-trimethylbenzoyl)phenylphosphinate (CAS: 84434-11-7), and 1-hydroxycyclohexyl phenyl ketone (CAS: 947-19-3).

In an embodiment, the step S1 can be performed in an organic solvent being one or more selected from the group consisting of tetrahydrofuran, ethanol, dimethylformamide, and dimethylacetamide. Conducting the polymerization reaction in the organic solvent allows for better control of viscosity. More specifically, the amount of the organic solvent added can be 50% to 120% of a total weight of the plant oil and the mercaptosuccinic acid.

In an embodiment, after the reaction in the step S1 is completed, a diluent is added to the system to dilute and separate out the biomass-based polyacid.

In an embodiment, in the step S1, the diluent can be at least one of dichloromethane and trichloromethane. More specifically, the amount of the diluent added can be 50%-150% of the total weight of the plant oil and the mercaptosuccinic acid.

In an embodiment, in the step S1, the reason for adding the diluent is that the reaction product is viscous. And the high viscosity restrains the removal of unreacted acid molecules, leading to difficulties in obtaining high-purity biomass-based polyacid.

In an embodiment, in the step S1, after adding the diluent to the system, it is also necessary to add a rinsing agent to rinse an organic phase. More specifically, the rinsing agent is saturated sodium chloride solution. Rinsing the organic phase with the saturated sodium chloride solution is a conventional operation in this art, which can yield biomass-based polyacid with high purity.

In an embodiment, in the step S1, time for the reacting is in a range of 4-15 h.

In an embodiment, in the step S2, the molar ratio of the total carboxyl groups in the biomass-based polyacid and the mono-carboxyl-terminated polydimethylsiloxane, to the aziridines in the aziridine crosslinker is in a range of 1:(0.95-1.05).

In a specific embodiment, in the step S2, the molar ratio of the total carboxyl groups in the biomass-based polyacid and the mono-carboxyl-terminated polydimethylsiloxane, to the aziridines in the aziridine crosslinker is 1:1.

The above range of the molar ratio of the total carboxyl groups in the biomass-based polyacid and the mono-carboxyl-terminated polydimethylsiloxane, to the aziridines in the aziridine crosslinker ensures that the carboxyl groups and the aziridines react fully, forming a heavily crosslinked anti-smudge coating.

In an embodiment, in the step S1, a density of the carbon-carbon double bonds in the plant oil is that: the quantity of the carbon-carbon double bonds per triglyceride unit is in a range of 4-8.

Controlling the density of the carbon-carbon double bonds in the plant oil enables the obtained paint to form a coating which is more heavily crosslinked.

In an embodiment, the density of the carbon-carbon double bonds in the plant oil is calculated through nuclear magnetic resonance integration.

In an embodiment, in the step S1, the molar ratio of the carbon-carbon double bonds in the plant oil to the mercaptosuccinic acid is not less than 1:1.5.

Excess mercaptosuccinic acid leads to waste.

In a specific embodiment, in the preparation of a biomass-based polyacid, i.e., the step S1, the molar ratio of the carbon-carbon double bonds in the plant oil to the mercaptosuccinic acid is 1:(1.2-1.4).

In an embodiment, the step S2 further includes: adjusting pH of a paint system to be equal to or greater than 7 before the mixing uniformly.

It should be noted that in a specific embodiment of the disclosure, the method of adjusting the pH includes adding an alkaline substance as a neutralizing agent. More specifically, in the disclosure, the biomass-based polyacid containing the carboxyl groups and the mono-carboxyl-terminated polydimethylsiloxane can be mixed first, followed by adding the neutralizing agent to adjust the pH, and then the aziridine crosslinker is added.

In the step S2, the pH of the paint system is first adjusted to ≥7 to make the paint system neutral or alkaline. This is because the aziridines in the aziridine crosslinker reacts immediately with the carboxyl groups under acidic conditions, resulting in an obtained biomass-based anti-smudge coating being difficult to achieve excellent anti-smudge performance, as it would be challenging to achieve uniform and consistent crosslinking density throughout the obtained coating. Moreover, the immediate reaction and curing of various substances in the paint would make it difficult to form a coating through subsequent coating methods such as spraying. Therefore, the pH of the paint system can be adjusted to ≥7 first.

In an embodiment, in the step S2, the pH of the paint system is adjusted by a neutralizing agent containing at least one of amino group and amine group.

In the step S2, first adjusting the pH to neutral or alkaline followed by adding the aziridine crosslinker can enhance the uniformity of the paint, thereby improving the uniformity of the obtained coating. A pH adjustment reagent is the neutralizing agent containing at least one of amino group and amine group. This is because a neutralization reaction between the amino groups and the carboxyl groups is reversible. Moreover, the pH adjustment process in the disclosure is performed at room temperature, where the amine groups do not undergo a condensation reaction with the carboxyl groups to form amides. Thermal treatment is necessary for the curing of coating. Under the condition of high temperature, the formed carboxylic acid ammonium decomposes upon heating into ammonia gas and carboxylic acid, and the neutralizing agent containing the amino groups partially escapes and volatilizes from the system; the neutralizing agent containing the amine groups that have not reacted with the carboxyl groups also escapes from the reaction system. By selecting the aforementioned neutralizing agent, there is no need to add an acidic reagent to adjust the pH<7 when the paint is to be cured into a coating. The reaction system can automatically become acidic and begin a curing reaction.

In an embodiment, in the step S2, the neutralizing agent is at least one of triethylamine and ammonia water.

In an embodiment, in the step S2, a molar ratio of the total carboxyl groups in the biomass-based polyacid and the mono-carboxyl-terminated polydimethylsiloxane, to the at least one of amino group and amine group in the neutralizing agent is in a range of 1:(1-1.1).

The molar ratio of the total carboxyl groups in the biomass-based polyacid and the mono-carboxyl-terminated polydimethylsiloxane, to the at least one of amino group and amine group in the neutralizing agent is controlled to ensure that the pH of the reaction system is ≥7. An excessive amount of the neutralizing agent can lead to an overly alkaline system, requiring longer time to fully remove the neutralizing agent during subsequent curing, resulting in unnecessary energy consumption.

In an embodiment, in the step S2, a molecular weight of the mono-carboxyl-terminated polydimethylsiloxane is in a range of 1500-5000.

If the molecular weight of the mono-carboxyl-terminated polydimethylsiloxane is too low, the low-surface-tension polydimethylsiloxane segments will have a smaller area of spread on the coating surface, which may lead to a decrease in the anti-smudge performance of the obtained coating. However, if the molecular weight of the mono-carboxylterminated polydimethylsiloxane is too high, its compatibility with the system will be even worse, leading to an opaque coating and an uneven surface, which will also result in a deterioration of the anti-smudge performance.

In an embodiment, in the step S2, the aziridine crosslinker is one or more selected from the group consisting of trimethylolpropane tris(2-methyl-1-aziridinepropionate) (CAS: 64265-57-2), 2-((3-aziridin-1-ylpropionyl)methyl)-2-ethylpropane-1,3-diyl bis(aziridine-1-propionate) (CAS: 52234-82-9), and pentaerythritol tris-[3-(1-aziridinyl)-propionate] (CAS: 57116-45-7).

The trimethylolpropane tris(2-methyl-1-aziridinepropionate), the 2-((3-aziridin-1-ylpropionyl)methyl)-2-ethylpropane-1,3-diyl bis(aziridine-1-propionate), and the pentaerythritol tris-[3-(1-aziridinyl)-propionate] all contain three reactive aziridines, which can be used to prepare a coating with high crosslinking.

In an embodiment, in the step S1, the reaction is under the UV light with a power in a range of 0.1-0.5 kilowatts (kW).

In an embodiment, in the step S1, the amount of the initiator added is 1.5%-5% of the total weight of the plant oil and the mercaptosuccinic acid.

The disclosure further protects the biomass-based anti-smudge paint prepared by the preparation method above.

The disclosure further protects the biomass-based anti-smudge coating made from the biomass-based anti-smudge paint.

Specifically, in the disclosure, a preparation method of the biomass-based anti-smudge coating includes the following step.

The biomass-based anti-smudge paint is diluted with water and coated by spraying, followed by curing, to obtain the biomass-based anti-smudge coating.

In an embodiment, in the preparation method of the biomass-based anti-smudge coating, the amount of the water added is in a range of 50%-110% of the biomass-based anti-smudge paint.

When the amount of the water added is in the above range, the obtained paint, after mixing all the materials, has a more suitable viscosity, which is conducive to a spraying process. In an embodiment, a curing temperature is in a range of 100-150° C.

Curing the biomass-based anti-smudge paint at 100-150° C. not only facilitates the condensation reaction between the aziridines and the carboxyl groups to reach equilibrium and proceed fully, but also completely removes the neutralizing agent used to adjust the pH in the system. Generally, the reaction between the carboxyl groups and the aziridines can occur at 80° C. However, in the disclosure, the reaction between the carboxyl groups and the aziridines is performed at a higher temperature of 100-150° C. to promote the migration of polydimethylsiloxane chain segments to the surface of the coating, thereby reducing the coating surface energy.

In an embodiment, time for the curing is in a range of 25-60 minutes (min).

The above conditions ensure that the polymerization reaction proceeds fully while the energy consumption of the reaction is not too high.

The disclosure further protects the application of the biomass-based anti-smudge coating in anti-smudge and anti-corrosion.

Compared with the related art, the disclosure may have the following beneficial effects.

The biomass-based anti-smudge paint is prepared by the disclosure, due to the use of biomass-based polyacid as the coating precursor, a coating obtained by curing the biomass-based anti-smudge paint is classified as a biomass-based coating. Additionally, the addition of crosslinker and low-surface-tension substances ensures that the coating made from the biomass-based anti-smudge paint not only has a heavy crosslinking density but also possesses a low surface energy, making it water-repellent and oil-repellent. The water contact angle on coating surface is as high as over 103°, and the hexadecane contact angle on coating surface is as high as over 28°. Furthermore, the coating demonstrates excellent anti-ink ability and self-cleaning performance.

DETAILED DESCRIPTION OF EMBODIMENTS

The disclosure is further explained below in conjunction with illustrative embodiments, but the illustrative embodiments do not limit the disclosure in any form. Unless otherwise specified, raw materials and reagents used in the illustrative embodiments of the disclosure are conventionally purchased raw materials and reagents.

Embodiment 1

A preparation method of a biomass-based anti-smudge paint, includes the following steps S1 and S2.

S1, a biomass-based polyacid is prepared as follows: soybean oil, mercaptosuccinic acid and 2-hydroxy-2-methyl-1-phenyl-1-propanone are mixed followed by reacting sufficiently under UV light irradiation with a power of 0.1 kW to obtain the biomass-based polyacid. Time for the reacting is 10 hours (h).

S2, the biomass-based anti-smudge paint is prepared as follows: the biomass-based polyacid obtained in the step S1 and mono-carboxyl-terminated polydimethylsiloxane are mixed uniformly, and then added with triethylamine to obtain a mixture, a molar ratio of total carboxyl groups in the biomass-based polyacid and the mono-carboxyl-terminated polydimethylsiloxane, to amine groups in the triethylamine is 1:1, making pH of a reaction system be approximately equal to 7, trimethylolpropane tris(2-methyl-1-aziridinepropionate) as an aziridine crosslinker is added to the mixture and then mixed uniformly to obtain the biomass-based anti-smudge paint.

In the step S1, a density of carbon-carbon double bonds in the soybean oil is that: the quantity of the carbon-carbon double bonds per triglyceride unit is 4.2.

In the step S1, a molar ratio of the carbon-carbon double bonds in the soybean oil to the mercaptosuccinic acid is 1:1.3.

In the step S2, a weight ratio of a total weight of the biomass-based polyacid and the aziridine crosslinker to the mono-carboxyl-terminated polydimethylsiloxane is 1:0.007.

In the step S2, a molar ratio of total carboxyl groups in the biomass-based polyacid and the mono-carboxyl-terminated polydimethylsiloxane, to aziridines in the aziridine crosslinker is 1:1.

A molecular weight of the mono-carboxyl-terminated polydimethylsiloxane is 2000.

In the step S1, the amount of the 2-hydroxy-2-methyl-1-phenyl-1-propanone added is 3% of a total weight of the soybean oil and the mercaptosuccinic acid.

Embodiment 2

A preparation method of a biomass-based anti-smudge paint, includes the following steps S1 and S2.

S1, a biomass-based polyacid is prepared as follows: flaxseed oil, mercaptosuccinic acid, and 2,2-dimethoxy-2-phenylacetophenone are mixed followed by reacting sufficiently under UV light irradiation with a power of 0.5 kW to obtain the biomass-based polyacid. Time for the reacting is 5 h.

S2, the biomass-based anti-smudge paint is prepared as follows: the biomass-based polyacid obtained in the step S1 and mono-carboxyl-terminated polydimethylsiloxane are mixed uniformly, and then added with ammonia water to obtain a mixture, a molar ratio of total carboxyl groups in the biomass-based polyacid and the mono-carboxyl-terminated polydimethylsiloxane, to amino groups in the ammonia water is 1:1.05, making pH of a reaction system be approximately equal to 7, trimethylolpropane tris(2-methyl-1-aziridinepropionate) as an aziridine crosslinker is added to the mixture and then mixed uniformly to obtain the biomass-based anti-smudge paint.

In the step S1, a density of carbon-carbon double bonds in the flaxseed oil is that: the quantity of the carbon-carbon double bonds per triglyceride unit is in 5.9.

In the step S1, a molar ratio of the carbon-carbon double bonds in the flaxseed oil to the mercaptosuccinic acid is 1:1.3.

In the step S2, a weight ratio of a total weight of the biomass-based polyacid and the aziridine crosslinker to the mono-carboxyl-terminated polydimethylsiloxane is 1:0.012.

In the step S2, a molar ratio of total carboxyl groups in the biomass-based polyacid and the mono-carboxyl-terminated polydimethylsiloxane, to aziridines in the aziridine crosslinker is 1:1.

A molecular weight of the mono-carboxyl-terminated polydimethylsiloxane is 5000.

In the step S1, the amount of the 2,2-dimethoxy-2-phenylacetophenone added is 3% of a total weight of the flaxseed oil and the mercaptosuccinic acid.

Embodiment 3

A preparation method of a biomass-based anti-smudge paint, includes the following steps S1 and S2.

S1, a biomass-based polyacid is prepared as follows: soybean oil and tung oil, mercaptosuccinic acid, and ethyl (2,4,6-trimethylbenzoyl)phenylphosphinate are mixed followed by reacting sufficiently under UV light irradiation with a power of 0.1 kW to obtain the biomass-based polyacid. Time for the reacting is 12 h. A weight ratio of the soybean oil to the tung oil is 7:3.

S2, the biomass-based anti-smudge paint is prepared as follows: the biomass-based polyacid obtained in the step S1 and mono-carboxyl-terminated polydimethylsiloxane are mixed uniformly, and then added with triethylamine to obtain a mixture, a molar ratio of total carboxyl groups in the biomass-based polyacid and the mono-carboxyl-terminated polydimethylsiloxane, to amine groups in the triethylamine is 1:1.07, making pH of a reaction system be approximately equal to 7, pentaerythritol tris-[3-(1-aziridinyl)-propionate] as an aziridine crosslinker is added to the mixture and then mixed uniformly to obtain the biomass-based anti-smudge paint.

In the step S1, densities of carbon-carbon double bonds in the soybean oil and the tung oil are: the quantity of the carbon-carbon double bonds per triglyceride unit is 4.2 and 7.7, respectively.

In the step S1, a molar ratio of total carbon-carbon double bonds in the soybean oil and the tung oil to the mercaptosuccinic acid is 1:1.3.

In the step S2, a weight ratio of a total weight of the biomass-based polyacid and the aziridine crosslinker to the mono-carboxyl-terminated polydimethylsiloxane is 1:0.004.

In the step S2, a molar ratio of total carboxyl groups in the biomass-based polyacid and the mono-carboxyl-terminated polydimethylsiloxane, to aziridines in the aziridine crosslinker is 1:1.

A molecular weight of the mono-carboxyl-terminated polydimethylsiloxane is 3000.

In the step S1, the amount of the ethyl (2,4,6-trimethylbenzoyl)phenylphosphinate added is 3% of a total weight of the soybean oil, the tung oil and the mercaptosuccinic acid.

Embodiment 4

A preparation method of a biomass-based anti-smudge coating, includes the following steps.

The biomass-based anti-smudge paint obtained in the embodiment 1 is diluted with water and coated by spraying, followed by curing at 135° C. for 40 min to obtain the biomass-based anti-smudge coating.

The amount of the water added is 100% of the biomass-based anti-smudge paint.

Embodiment 5

A preparation method of a biomass-based anti-smudge coating, includes the following steps.

The biomass-based anti-smudge paint obtained in the embodiment 2 is diluted with water and coated by spraying, followed by curing at 100° C. for 60 min to obtain the biomass-based anti-smudge coating.

The amount of the water added is 50% of the biomass-based anti-smudge paint.

Embodiment 6

A preparation method of a biomass-based anti-smudge coating, includes the following steps.

The biomass-based anti-smudge paint obtained in the embodiment 3 is diluted with water and coated by spraying, followed by curing at 150° C. for 25 min to obtain the biomass-based anti-smudge coating.

The amount of the water added is 110% of the biomass-based anti-smudge paint.

Comparative Embodiment 1

A preparation method of a biomass-based anti-smudge paint, differs from the embodiment 1 in the following aspects.

In step S1, the soybean oil, thioglycolic acid, and the 2-hydroxy-2-methyl-1-phenyl-1-propanone are mixed and subjected to a polymerization reaction to obtain a biomass-based polyacid.

The preparation of the biomass-based anti-smudge paint in the comparative embodiment 1 is performed as described in the embodiment 1.

Comparative Embodiment 2

A preparation method of a biomass-based anti-smudge paint, differs from the embodiment 1 in the following aspects.

The soybean oil is replaced with castor oil.

In the step S1, a density of carbon-carbon double bonds in the castor oil is that: the quantity of the carbon-carbon double bonds per triglyceride unit is 3.0.

Comparative Embodiment 3

A preparation method of a biomass-based anti-smudge paint, differs from the embodiment 1 in the following aspects.

In the step S2, no mono-carboxyl-terminated polydimethylsiloxane is added.

Comparative Embodiment 4

A preparation method of a biomass-based anti-smudge coating, differs from the embodiment 4 in the following aspects.

The biomass-based anti-smudge paint is obtained in the comparative embodiment 1.

Comparative Embodiment 5

A preparation method of a biomass-based anti-smudge coating, differs from the embodiment 4 in the following aspects.

The biomass-based anti-smudge paint is obtained in the comparative embodiment 2.

Comparative Embodiment 6

A preparation method of a biomass-based anti-smudge coating, differs from the embodiment 4 in the following aspects.

The biomass-based anti-smudge paint is obtained in the comparative embodiment 3.

Performance tests are as follows.

Contact angle test: A Dataphysics OCA40 Micro contact angle meter is used to measure the liquid contact angle on coating surfaces. The volume of water and hexadecane used is 5 microliters ($\mu L$) each, measurements are taken five times and the average value is thereby calculated.

Transmittance test: A UV spectrophotometer is used to determine the transparency of the coating samples. The thickness of the coating samples is approximately 12 micrometers ($\mu m$), measurements are taken at different positions five times and the average value is thereby calculated.

Coating hardness test: The hardness of the coating samples is tested according to the ASTM D3363 standard.

Coating adhesion test: The adhesion of the coating samples is tested according to the ASTM D2197 standard.

Coating corrosion resistance test: The corrosion resistance of the coating samples is tested according to the ASTM D1654 standard.

Anti-ink test: If the oil-based marker ink contract on a surface of a coating sample and can be easily wiped off with a tissue, the anti-ink ability of the coating sample is evaluated as excellent; otherwise, it is evaluated as fail.

Self-cleaning performance test: The coating samples are immersed in crude oil and then lifted. If the crude oil contracts and detaches from the surface of a coating sample, the self-cleaning performance of the coating sample is evaluated as excellent; otherwise, it is evaluated as fail.

The anti-smudge performance of the coating can be assessed based on the anti-ink ability and the self-cleaning performance. If both the anti-ink ability and the self-cleaning performance are evaluated as excellent, the anti-smudge performance of the coating is considered to be excellent.

Specific performance test data is shown in Table 1 as follows.

TABLE 1 performance test data of the embodiments and comparative embodiments

| Performance | Embodiment 4 | Embodiment 5 | Embodiment 6 | Comparative embodiment 4 | Comparative embodiment 5 | Comparative embodiment 6 |
| --- | --- | --- | --- | --- | --- | --- |
| Water contact angle | 103.4° | 103.7° | 103.2° | 101.5° | 101.8° | 90.8° |
| Hexadecane contact angle | 28.5° | 28.9° | 28.3° | 24.3° | 25.1° | 10.4° |
| Transmittance | 98.3% | 98.0% | 98.1% | 98.3% | 98.2% | 98.8% |
| Hardness | 3H | 3H | 3H | 2H | 2H | 3H |
| Adhesion | 5B | 5B | 5B | 5B | 5B | 5B |
| Corrosion resistance | Excellent | Excellent | Excellent | Fail | Fail | Fail |
| Anti-ink ability | Excellent | Excellent | Excellent | Fail | Fail | Fail |
| Self-cleaning | Excellent | Excellent | Excellent | Fail | Fail | Fail |

From Table 1, it can be seen that the biomass-based anti-smudge coating prepared by the disclosure has excellent comprehensive performance. The anti-smudge performance can be judged from several aspects, including contact angles, anti-ink ability, and self-cleaning performance. As shown in Table 1, the coating formed by the paint prepared by the disclosure has a water contact angle over 103° and a hexadecane contact angle over 28°, initially indicating that the coating has hydrophobic and oleophobic properties. However, the contact angles alone cannot directly determine the anti-smudge performance. It is necessary to consider the anti-ink ability and self-cleaning performance as well. This is because a high contact angle only indicates low coating surface energy and does not necessarily mean that the coating is heavily crosslinked internally. If the coating is not heavily crosslinked, it means that pollutants can penetrate into coating matrix, thereby reducing its anti-smudge performance. Therefore, the disclosure also conducts tests for the anti-ink ability and the self-cleaning performance. The test data from these two properties show that the cured coating has an excellent crosslinking density, which prevents pollutants from penetrating into the coating matrix and leaving marks, thus ensuring excellent anti-smudge performance.

The corrosion resistance test is also to demonstrate that the coating prepared by the disclosure has an excellent crosslinking density. The fact that the adhesion is rated as 5B indicates that the coating provided by the disclosure has excellent adhesion, showing potential for practical application in various fields through methods such as spraying. Additionally, the coating provided by the disclosure also has high hardness, indicating good mechanical properties.

Transmittance test is to observe the compatibility of the mono-carboxyl-terminated polydimethylsiloxane with the reaction system and to predict its anti-smudge performance. If the transmittance value is low, it indicates poor compatibility of the polydimethylsiloxane with the reaction system, leading to macroscopic phase separation. In this case, the flatness of the coating surface is greatly reduced, and the anti-smudge performance is also significantly deteriorated.

In the comparative embodiment 1, thioglycolic acid is used to replace mercaptosuccinic acid, resulting in half the quantity of carboxyl groups under the same molar amount, which means that the coating obtained in the comparative embodiment 4 has a significantly reduced crosslinking density. Comparing the comparative embodiment 4 with the embodiment 4, it can be seen that the reduction in crosslinking density significantly affects the hardness, corrosion resistance, anti-ink ability, and self-cleaning performance of the coating. This indicates that the mercaptosuccinic acid enhances the crosslinking density of the coating and improves its anti-smudge performance. From the comparative embodiment 5, it can be seen that the density of double bonds in the plant oil also affects the crosslinking density of the coating obtained. Therefore, using the biomass-based polyacid obtained from reaction with the castor oil as a raw material for coating preparation results in a decrease in density and poorer performance in all aspects compared to the coating obtained in the embodiments. Additionally, comparing the comparative embodiment 6 with the embodiment 4, it can be seen that no polydimethylsiloxane added as a low-surface-tension modifier fails to achieve anti-smudge performance. This demonstrates that the addition of the low-surface-tension substance is another key factor in the preparation of the anti-smudge coating.

Apparently, the above embodiments of the disclosure are only examples provided to clearly illustrate the disclosure, and are not limitations on implementations of the disclosure. For those skilled in the art, other forms of changes or modifications can be made based on the above explanation. It is not necessary and impossible to exhaustively list all implementation methods here. Any amendments, equivalent substitutions, and improvements made within the spirit and principles of the disclosure shall be included within the scope of protection of the claims of the disclosure.

What is claimed is:

1. A preparation method of a biomass-based anti-smudge paint, comprising the following steps:
    S1, preparing a biomass-based polyacid, comprising: mixing plant oil, mercaptosuccinic acid and an initiator, followed by reacting under light irradiation to obtain the biomass-based polyacid; and
    S2, preparing the biomass-based anti-smudge paint, comprising: mixing the biomass-based polyacid obtained in the step S1, an aziridine crosslinker and mono-carboxyl-terminated polydimethylsiloxane uniformly to obtain the biomass-based anti-smudge paint;
    wherein in the step S1, a molar ratio of carbon-carbon double bonds in the plant oil to the mercaptosuccinic acid is not greater than 1:1.05;
    wherein in the step S2, a weight ratio of a total weight of the biomass-based polyacid and the aziridine crosslinker to the mono-carboxyl-terminated polydimethylsiloxane is 1:(0.004-0.012);
    wherein in the step S2, a molar ratio of total carboxyl groups in the biomass-based polyacid and the mono-carboxyl-terminated polydimethylsiloxane to aziridines in the aziridine crosslinker is 1:(0.85-1.3).

2. The preparation method of the biomass-based anti-smudge paint as claimed in claim 1, wherein in the step S1, a density of the carbon-carbon double bonds in the plant oil is that: a quantity of the carbon-carbon double bonds per triglyceride unit is in a range of 4-8.

3. The preparation method of the biomass-based anti-smudge paint as claimed in claim 1, wherein in the step S1, the molar ratio of the carbon-carbon double bonds in the plant oil to the mercaptosuccinic acid is not less than 1:1.5.

4. The preparation method of the biomass-based anti-smudge paint as claimed in claim 1, wherein the step S2 further comprises: adjusting pH of a paint system to be equal to or greater than 7 before the mixing uniformly.

5. The preparation method of the biomass-based anti-smudge paint as claimed in claim 4, wherein in the step S2, the pH of the paint system is adjusted by a neutralizing agent containing at least one of amino group and amine group.

6. The preparation method of the biomass-based anti-smudge paint as claimed in claim 1, wherein in the step S2, a molecular weight of the mono-carboxyl-terminated polydimethylsiloxane is in a range of 1500-5000.

7. The preparation method of the biomass-based anti-smudge paint as claimed in claim 1, wherein in the step S1, the reacting is under ultraviolet light with a power in a range of 0.1-0.5 kilowatts.

* * * * *